H. V. COES.
TIME CONTROLLED OIL BURNING HEATING APPARATUS.
APPLICATION FILED MAR. 8, 1915.
1,150,501.
Patented Aug. 17, 1915.
5 SHEETS—SHEET 1.
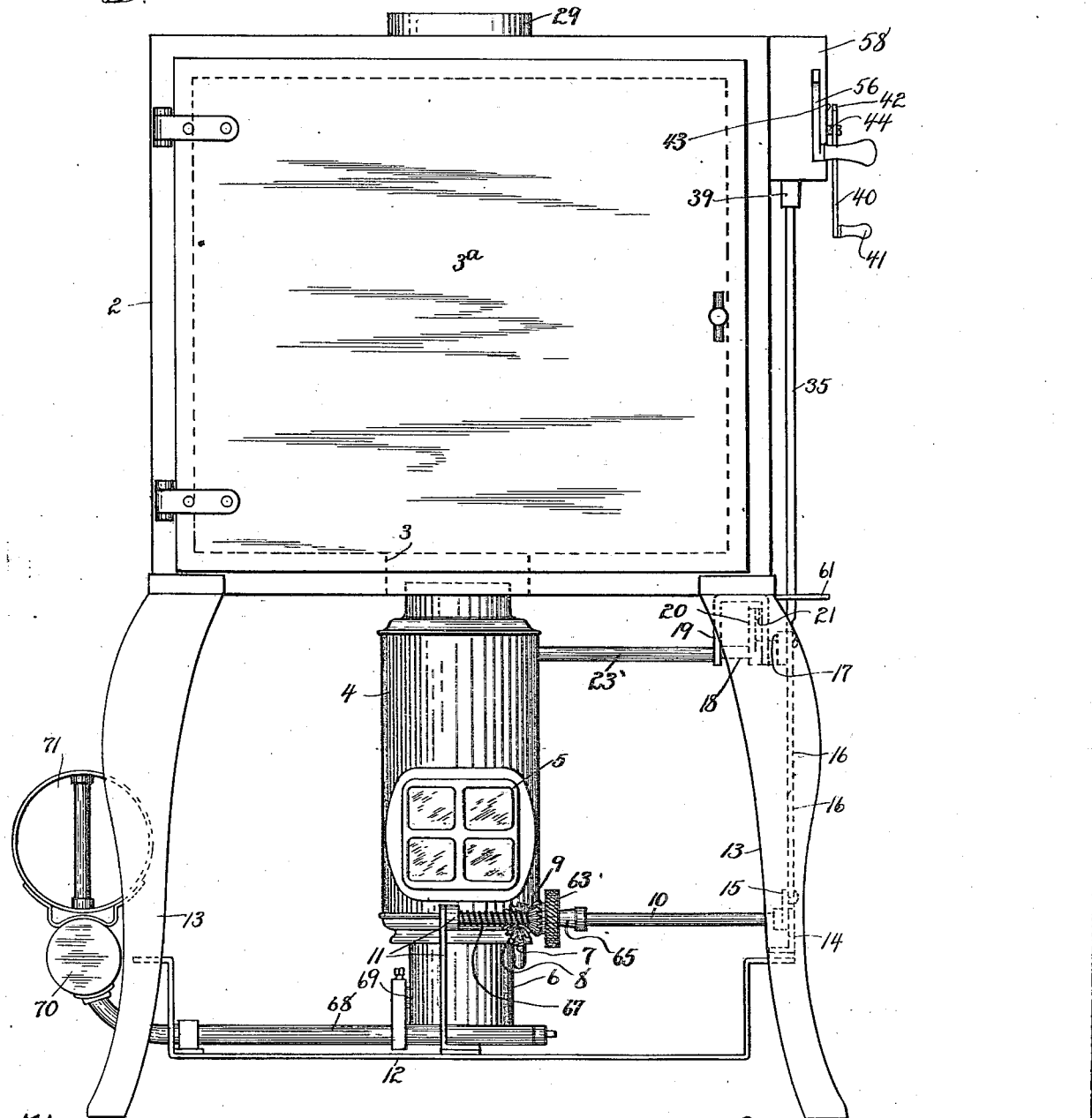

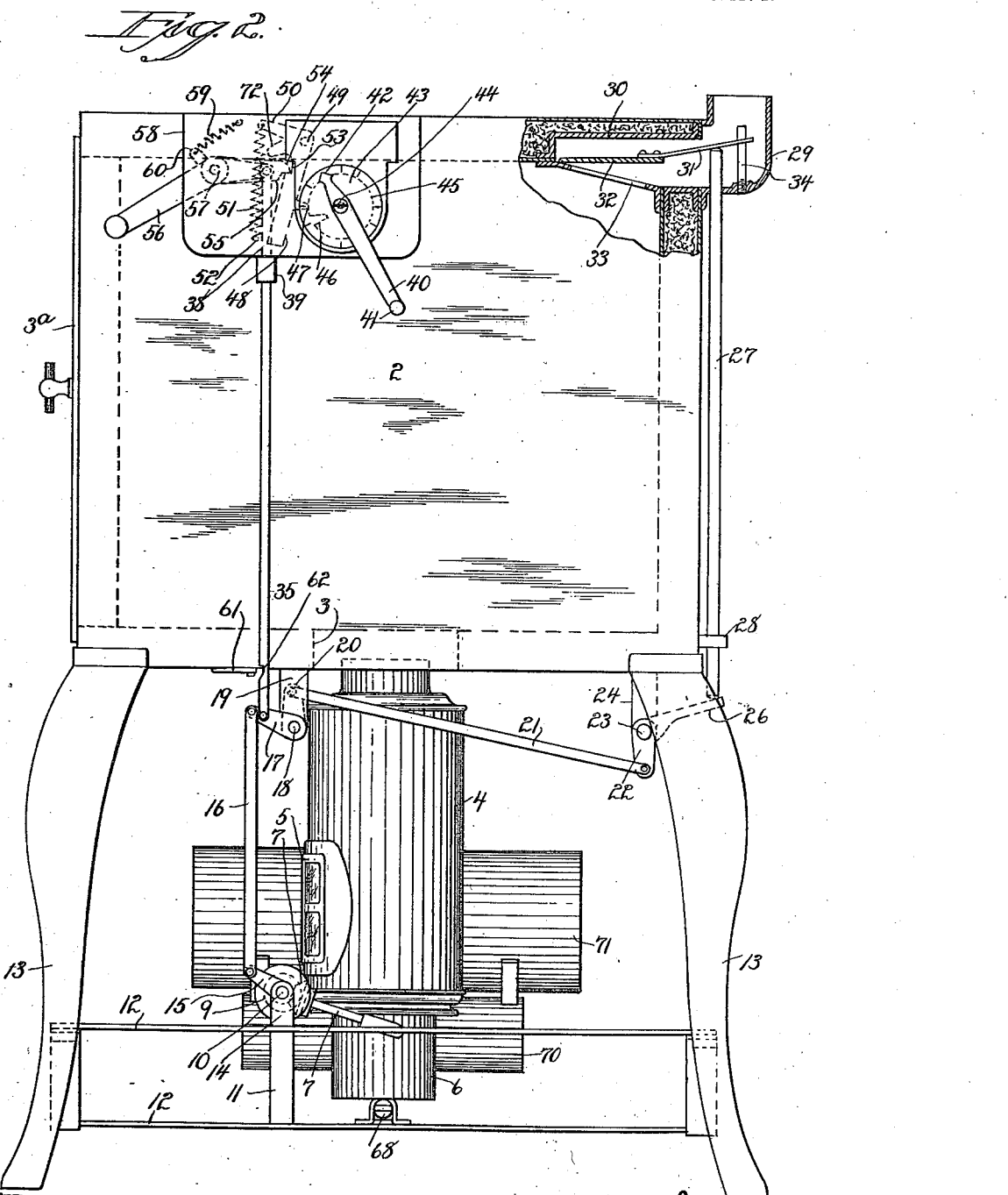

H. V. COES.
TIME CONTROLLED OIL BURNING HEATING APPARATUS.
APPLICATION FILED MAR. 8, 1915.
1,150,501.
Patented Aug. 17, 1915.
5 SHEETS—SHEET 3.
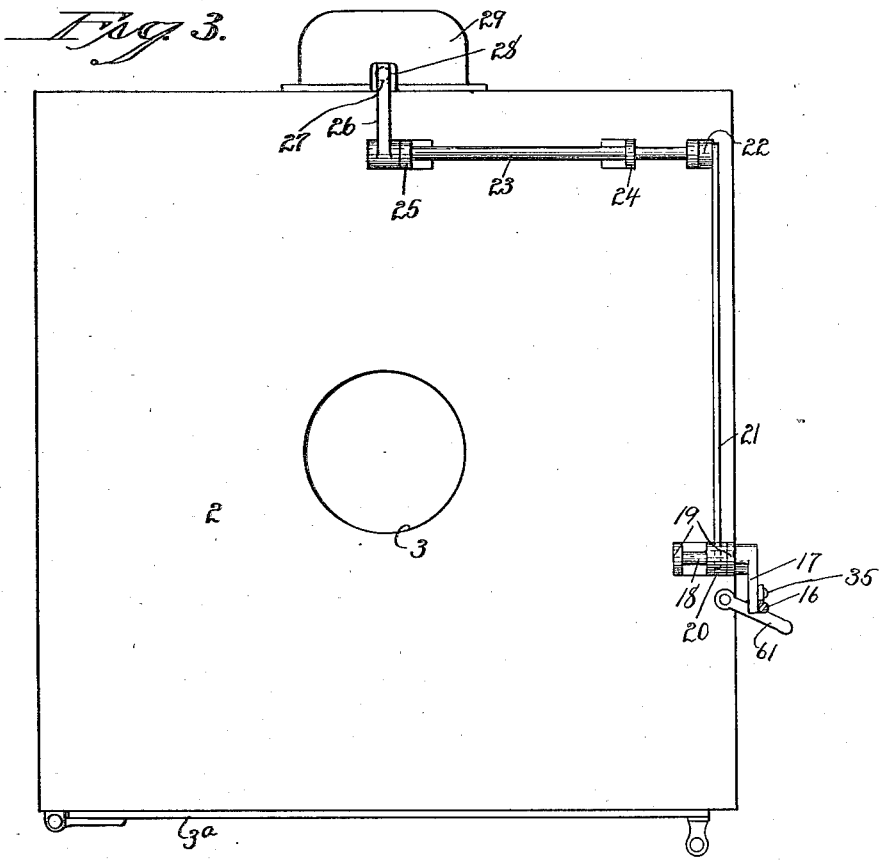
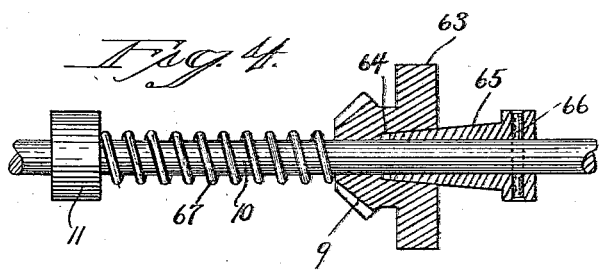
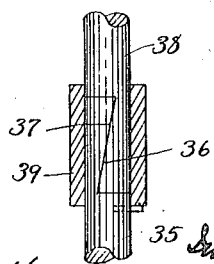

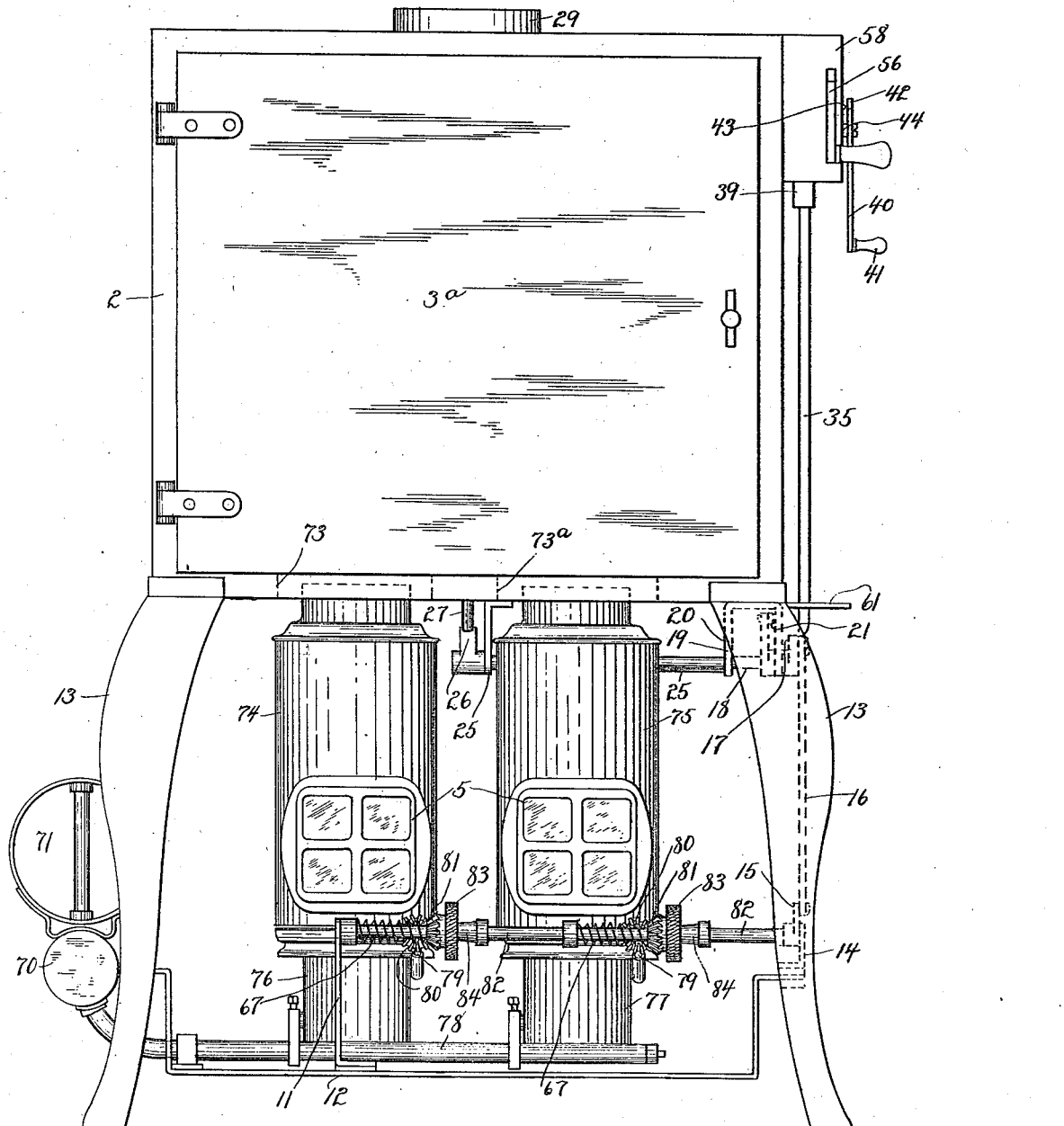

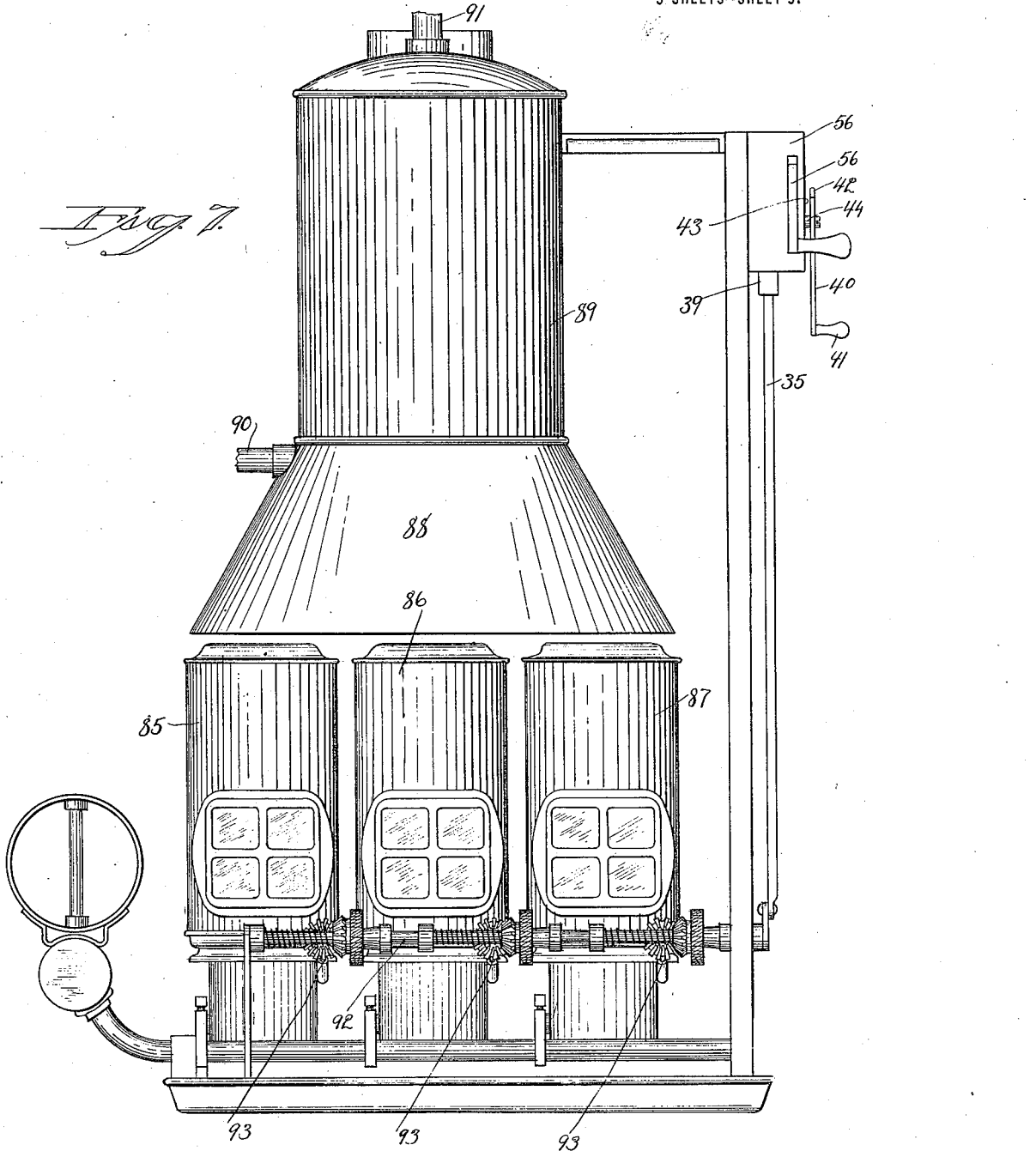

UNITED STATES PATENT OFFICE.

HAROLD V. COES, OF NEW HAVEN, CONNECTICUT, ASSIGNOR TO THE SENTINEL MFG. CO., OF NEW HAVEN, CONNECTICUT, A CORPORATION.

TIME-CONTROLLED OIL-BURNING HEATING APPARATUS.

1,150,501.  Specification of Letters Patent.  Patented Aug. 17, 1915.

Application filed March 8, 1915. Serial No. 13,037.

*To all whom it may concern:*

Be it known that I, HAROLD V. COES, a citizen of the United States, residing at New Haven, in the county of New Haven and State of Connecticut, have invented a new and useful Improvement in Time-Controlled Oil-Burning Heating Apparatus; and I do hereby declare the following, when taken in connection with the accompanying drawings and the characters of reference marked thereon, to be a full, clear, and exact description of the same, and which said drawings constitute part of this application, and represent, in—

Figure 1 a view in front elevation of an automatic oil-burning cooking apparatus constructed in accordance with my invention. Fig. 2 a view thereof in right-hand side elevation. Fig. 3 a reverse plan view thereof. Fig. 4 a broken detail sectional view showing one form which the friction coupling for the manual regulator of the wick may assume. Fig. 5 a broken detail sectional view showing one form which the coupling for the operating rods may assume. Fig. 6 a view in front elevation of a cooking apparatus constructed in accordance with my invention, and having a plurality of burners controlled by a single time-controlled apparatus but adapted to be manually adjusted independently of each other. Fig. 7 a view in front elevation of my improvement applied to an automatic time-controlled water-heater.

My invention relates to a time-controlled oil-burning heating apparatus for cooking, heating water, etc., etc., the object being to produce a simple, reliable and convenient time-controlled apparatus employing one or more automatically extinguished oil-burners and characterized by the independent manual control of the burner or burners without disturbing the automatic time-control thereof.

With these ends in view, my invention consists in a time-controlled oil-burning heating apparatus having certain details of construction and combinations of parts as will be hereinafter described and pointed out in the claims.

For the illustration of my invention, I have shown it in Figs. 1 to 5 inclusive, as applied to a cooking apparatus having a single oil-burner, in Fig. 6 as applied to a cooking apparatus having two oil-burners, and in Fig. 7 as applied to a water-heater having three oil-burners.

In carrying out my invention as shown in Figs. 1 to 5 inclusive, an insulated cooking compartment 2 having a door 3ª, is provided in its bottom with a circular, centrally arranged ingress draft-passage 3 receiving the upper end of a circular burner-casing 4 furnished with a door 5 and having a depending wick-pot 6 from which a wick-adjusting shaft 7 projects upwardly and forwardly. Upon the upper end of the said shaft I locate a beveled pinion 8 meshing into a corresponding pinion 9 frictionally coupled with a horizontal wick-operating shaft 10 the inner end of which is journaled in the upper end of a bracket 11 attached to a burner-frame 12 carrying the burner and itself supported by the legs 13 upon which the cooking-compartment 2 rests. The outer end of the shaft 10 is journaled in a bracket 14 also attached to the burner-frame 12 as shown in Figs. 1 and 2. At its outer end the shaft 10 is provided with a short rocker-arm 15 connected with the lower end of a link 16 the upper end of which is connected with a rocker-arm 17 mounted upon the outer end of a short rocker-shaft 18 journaled in a yoke 19 secured to the bottom of the cooking-compartment 2. The said shaft 18 also mounts a rocker-arm 20 connected with the forward end of a link 21 the other end of which is connected with a rocker-arm 22 mounted upon the outer end of a rocker-shaft 23 journaled in bearings 24, 25, and having its inner end provided with a lifting-arm 26 co-acting with the lower end of a long lifting-rod 27 sliding at its lower end in a bearing 28 and having its upper end entered into a flue-connection 29 attached to a damper-casing 30 set into an opening in the upper portion of the cooking-compartment 2. The upper end of the said rod 27 engages with the tongue 31 of a damper 32 located within the casing 30 over the egress draft-passage 33 formed therein. A guide 34 located within the flue-connection 29, guards against the lateral displacement of the damper-tongue 31.

The link 16 operating the wick, and the link 21 operating the damper or closure 32, are simultaneously operated by means of a rod 35 the lower end of which is connected with the rocker-arm 17 aforesaid, and the upper end of which is formed with a dovetail 36 co-acting with a corresponding dovetail 37 at the lower end of a coupling-rod 38, the dovetails 36 and 37 being held together by a sleeve 39 as shown in Fig. 5. The said coupling-rod 38 constitutes a member of a self-contained time-controlled operating-mechanism which by preference will be constructed in accordance with the disclosure of my co-pending application filed Feb. 20, 1915, Serial No. 9561. As herein shown, the said mechanism comprises a setting-lever 40 having at its lower end a handle 41, and at its upper end an index-pointer 42 sweeping over a graduated dial 43. The said lever is mounted upon a spring-actuated winding-arbor 44 carrying a timing-disk 45 having a timing-notch 46 adapted to receive the tooth 47 of a timing-lever or trigger 48 pivoted upon a stud 49 and having at its upper end an arm 50 connected with the upper end of a helical spring 51 the lower end of which is attached to a stud 52, the said spring operating to constantly keep the tooth 47 in engagement with the periphery of the disk 45 or entered into the notch 46 thereof. The said timing-lever 48 is also formed with a notch 53 receiving the nose 54 of a latch-arm 55 forming a part of an operating-lever or handle 56 hung upon a rocker-shaft 57 journaled in the frame 58 in which all of the parts of the self-contained time-controlled operating-mechanism are assembled in a unitary organization.

A spring 59 connected at one end with the frame 58 and at the other end with a lug 60 of the lever 56, exerts a constant effort to push the operating-rod 35 downward to simultaneously depress the wick and extinguish the light, and to close the damper 32 upon the egress draft-passage 33. Conversely, when the operating-lever 56 is pulled down against the tension of its spring 59, the rod 35 is lifted with the effect of raising the wick into its lighting position, and lifting the damper 32 into its open position, the wick and damper being retained in these positions by the engagement of the nose 54 of the latch-arm 55 with the shoulder forming the bottom of the notch 53 of the timing-lever 48, after the setting-lever 40 has been turned to move the timing-notch 46 out of registration with the tooth 47 of the timing-lever 48. Thus it will be seen that the setting of the timing-mechanism becomes a condition precedent to the maintenance of the wick in its raised position and the damper in its open position.

In case the self-contained time-controlled mechanism should be removed, or become disordered, the rod 35 may be retained in its elevated position by means of a latch 61 entering a notch 62 in its lower end.

The raising and lowering of the link 16 as described, effects, through the rotation of the shaft 10, the manual raising and automatic lowering of the wick for a given distance, but in order to compensate for the wasting away and slippage of the wick, as well as for the adjustment of the flame, I provide for manually adjusting the wick without interfering with its fixed or predetermined movement. For the adjustment of the wick a variety of devices may be employed. The device herein shown, is a friction device, whereby the pinions 8 and 9 may be turned by a knurled hand-wheel 63 formed integral with the said pinion 9 and having a concentric tapered bore 64 receiving one end of a friction cone 65 secured to the shaft 10 by a pin 66. A spring 67 encircling the shaft 10 and interposed between the bracket 11 and the pinion 9 exerts a constant effort to crowd the combined pinion and hand-wheel 63 against the friction cone 65, wherby the pinion 9 is normally coupled with the shaft 10 so that when the same is mechanically rotated the wick will be raised and lowered for a given distance. However by grasping the hand-wheel 63, the pinion 9 may be rotated against the friction of the cone 65 so as to slide thereon and effect the raising or lowering of the wick to any desired extent to compensate for wastage or slippage, or to effect a close adjustment of the flame. The friction of the cone 65 will be sufficient to cause the pinion 9 to turn with the shaft 10 as the same is operated by the link 16.

As herein shown, the wick-pot 6 is supplied with oil from a pipe 68 through a coupling 69 located at its inner end, while its outer end supports a feed-cup 70 receiving oil from a reservoir 71 of any approved construction.

In the operation of my improved cooking apparatus, the operating-lever or handle 56 is first drawn downward to cause the latch-arm 51 to engage with the lifting-arm 72 of the timing-lever or trigger 48 so as to swing the same to retract its tooth 47 from the timing-notch 46 in the timing-disk 45, whereby the timing-mechanism proper is unlocked and prepared, as it were, to be cocked. The setting-lever 40 is now swung clockwise from left to right until its index-pointer 42 is brought to registration with the particular graduation on the dial 43 representing the desired time-limit, the operating-lever 56 being held down against the tension of the power-spring 59 until the notch 46 has been moved out of registration with the tooth 47 of the lever or trigger 48 which is now held by the riding of the said tooth upon the periphery of the said disk, in its latched or cocked position in which it holds the handle or lever 56 in position to be tripped. When the said lever 56 was pulled down, as described, it operated through the rod 35 and the links 16 and 21 to raise the wick of the burner into its burning position as well as to raise the damper 32 into its open position above the egress draft-passage 33. The wick and damper will be maintained in their raised positions by the latching of the operating-lever or manual 56 by the timing-lever or trigger 48 which in turn is maintained in its cocked or latched position by the disk 45. The wick is lighted through the door 5 of the burner casing 4 and manually adjusted if required by the hand-wheel 63. Now at the expiration of the time-limit to which the device is set, the timing-notch 46 will be brought into registration with the tooth 47, whereupon the spring 51 will act to enter the said tooth into the said notch and thus release the operating-lever 56 to the action of the power spring 59 which will force the rod 35 downward and hence act through the links 16 and 21 to close the damper 32 and depress the wick into the position in which the flame is extinguished.

In the modified construction shown by Fig. 6 of the drawings, the cooking compartment 2 is provided in its bottom with two ingress draft-passages 73, 73ª, respectively receiving the contracted upper ends of two burner-casings 74, 75, the wick-pots 76, 77, whereof are connected with a feed-pipe 78 leading to a feed-cup 70 receiving oil from a reservoir 71. The wick-shafts 79 of the respective burners are furnished with beveled pinions 80 meshing into corresponding pinions 81 frictionally mounted upon a wick-operating shaft 82 corresponding to the shaft 10 before mentioned, and connected by the same series of parts as shown in Figs. 1 and 2 with the same time-controlled operating mechanism which thus automatically controls the operation of both burners which are independently operated by hand-wheels 83, 83, receiving friction cones 84, 84, pinned to the shaft 82 in the manner shown in Fig. 4. Under this construction the burners 74, 75, will be collectively operated by the time-controlled operating mechanism and manually operated independent of each other by their respective hand-wheels 83. Of course this principle may be extended, as desired, by furnishing any oven with any number of burners all collectively operated from a common shaft corresponding to the shaft 82, and all adapted to be independently operated.

Fig. 7 illustrates the embodiment of my invention in a water-heater having a battery of three burners 85, 86 and 87 located below a hood 88 converging into a heating drum 89 having water inlet and outlet pipes 90, 91, connected with an ordinary boiler in the customary manner, the drum 89 taking the place of the ordinary water-back of a kitchen range. The three burners described are connected together for collective automatic operation by means of a wick-operating shaft 92 frictionally coupled with the wick-shafts 93 of the respective burners in the manner already described, so that under normal conditions the said shafts will be automatically operated by the wick-operating shaft 92 with a capacity for being independently manually operated. The outer end of this shaft 92 is connected by the rod 35 with the timing mechanism to which, as far as shown in detail, the same designating numbers are applied as in Figs. 1, 2 and 6. In this water-heater the three oil-burners 85, 86 and 87, are automatically controlled by a single timing-mechanism and without interfering with their independent manual control or adjustment.

It is apparent from the foregoing that my present invention is not concerned so much with the particular form or character of the member heated or with the number of burners employed, since those factors will vary with the intended use of the apparatus. My invention is characterized, on the other hand, by provision for the independent manual adjustment at any time of one or more oil-burners within the range of movement or "throw" provided for the manual and automatic operation of the burners in being positioned for lighting and in being extinguished. My invention is further characterized by the collective operation of a plurality of burners by a single timing-apparatus the setting of which is a condition precedent to holding the burners in adjustment for use.

I claim:—

1. In a time-controlled oil-burning heating apparatus, the combination with an oil burner, of a time-controlled operating mechanism connected with the said burner for the automatic extinguishment thereof, and means for the manual operation of the burner independent of its automatic time-control.

2. In a time-controlled oil-burning heating apparatus, the combination with an oil burner, of a time-controlled operating mechanism, and means for connecting the said time-controlled mechanism with the said oil-burner for the automatic extinguishment thereof, the said means including a device for the independent manual operation of the burner.

3. In a time-controlled oil-burning heating apparatus, the combination with an oil burner, of a time-controlled operating mechanism, means for connecting the said burner and mechanism, whereby the burner is manually positioned for lighting and automatically extinguished, and means for the independent manual operation of the burner, whereby it may be adjusted within the range of its movement by the said mechanism.

4. In a time-controlled oil-burning heating apparatus, the combination with a plurality of oil-burners, of a time-controlled operating mechanism connected with all of the said burners for automatically controlling the same collectively, and means for the independent manual operation of the respective burners without interfering with the collective automatic operation thereof.

5. In a time-controlled oil-burning heating apparatus, the combination with an oil-burner having a wick-shaft, of a time-controlled operating mechanism, and connection between the said mechanism and the wick-shaft of the burner, whereby the wick is manually raised and automatically lowered and extinguished, the said connection including a friction device permitting the manual operation of the wick without disturbing the action of the said time-controlled operating mechanism.

6. In a time-controlled oil-burning heating apparatus, the combination with an oil-burner having a wick-shaft, a time-controlled operating mechanism, and connection between the said mechanism and wick-shaft, whereby the wick is manually raised and automatically lowered and extinguished, the said connection including a shaft rotated by the said mechanism, a friction cone mounted upon the said shaft, and a combined pinion and hand-wheel applied to the friction-cone and having gear connection with the wick-shaft.

7. In a time-controlled oil-burning heating apparatus, the combination with an oil-burner, of a time-controlled operating mechanism, connection between the said mechanism and burner, whereby the burner is manually positioned at pleasure for lighting, and automatically extinguished at a predetermined time, and a friction device permitting the manual operation of the burner independent of the said time-controlled operating mechanism.

8. In a time-controlled oil-burning and heating apparatus, the combination with a heating compartment having ingress and egress draft-passages, of a closure for the egress draft-passage, an oil-burner co-acting with the ingress draft-passage, and a self-contained, combined manually operable and time-controlled operating mechanism attached to the said compartment and connected with the said closure and burner, whereby, the closure is manually opened and the wick of the burner manually positioned for lighting, and, whereby, the sealing of the egress draft-passage by the said closure and the extinguishment of the burner is automatically controlled.

In testimony whereof, I have signed this specification in the presence of two subscribing witnesses.

HAROLD V. COES.

Witnesses:
ADELAIDE C. HEDERMAN,
G. F. GARRITY.